(12) United States Patent
Lee et al.

(10) Patent No.: US 9,705,153 B2
(45) Date of Patent: Jul. 11, 2017

(54) RECHARGEABLE BATTERY AND PACK OF THE SAME

(71) Applicant: SAMSUNG SDI CO., LTD., Yongin-si, Gyeonggi-do (KR)

(72) Inventors: Hyun-Soo Lee, Yongin-si (KR); Jeong-Won Oh, Yongin-si (KR); Sang-Shin Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/835,453

(22) Filed: Aug. 25, 2015

(65) Prior Publication Data
US 2016/0204463 A1   Jul. 14, 2016

(30) Foreign Application Priority Data

Jan. 14, 2015  (KR) ........................ 10-2015-0006989

(51) Int. Cl.
H01M 10/04 (2006.01)
H01M 2/02 (2006.01)
(Continued)

(52) U.S. Cl.
CPC ....... H01M 10/049 (2013.01); H01M 2/0202 (2013.01); H01M 2/024 (2013.01); H01M 2/027 (2013.01); H01M 2/0217 (2013.01); H01M 2/0426 (2013.01); H01M 2/0473 (2013.01); H01M 2/12 (2013.01); H01M 2/1241 (2013.01); H01M 10/0431 (2013.01)

(58) Field of Classification Search
CPC ...... H01M 2/0202; H01M 2/024; H01M 2/12; H01M 2/0217; H01M 2/027; H01M 2/0426; H01M 2/0473; H01M 2/1241; H01M 10/049; H01M 10/0431
See application file for complete search history.

(56) References Cited

U.S. PATENT DOCUMENTS

2009/0233169 A1   9/2009   Kakuchi et al.
2012/0141844 A1   6/2012   Lamm et al.
(Continued)

FOREIGN PATENT DOCUMENTS

EP   2 709 191 A1   3/2014
JP   2001-256944 A   9/2001
(Continued)

OTHER PUBLICATIONS

Abstract and Machine English Translation of JP 2007-179793 A, Jul. 12, 2007, 11 Pages.
(Continued)

*Primary Examiner* — Jane Rhee
(74) *Attorney, Agent, or Firm* — Lewis Roca Rothgerber Christie LLP

(57) ABSTRACT

A rechargeable battery includes an electrode assembly for charging and discharging a current, a case having an opening in a direction intersecting a plane of the electrode assembly, and a cover for sealing the opening in the case which houses the electrode assembly therein, wherein the case further includes a vent integral with the case on one side of an extension direction of the plane of the electrode assembly, and a vent protective portion formed adjacent to the vent.

13 Claims, 7 Drawing Sheets

(51) Int. Cl.
*H01M 2/12* (2006.01)
*H01M 2/04* (2006.01)

(56) References Cited

U.S. PATENT DOCUMENTS

| 2012/0258338 A1* | 10/2012 | Kim ................... H01M 2/0404 429/53 |
| 2013/0122335 A1 | 5/2013 | Park et al. |
| 2013/0216873 A1* | 8/2013 | Schaefer ............ H01M 2/0212 429/82 |

FOREIGN PATENT DOCUMENTS

| JP | 2001-283793 A | 10/2001 |
| JP | 2007-179793 A | 7/2007 |

OTHER PUBLICATIONS

Extended European Search Report dated Apr. 20, 2016 for European Application No. EP 15196979.7, 7 pages.
Patent Abstracts of Japan and Machine English Translation for JP 2001-256944 A, Sep. 21, 2001, 10 Pages.
Patent Abstracts of Japan and Machine English Translation for JP 2001-283793 A, Oct. 12, 2001, 10 Pages.

* cited by examiner

RECHARGEABLE BATTERY AND PACK OF THE SAME

CROSS-REFERENCE TO RELATED APPLICATION

This application claims priority to and the benefit of Korean Patent Application No. 10-2015-0006989 filed in the Korean Intellectual Property Office on Jan. 14, 2015, the entire contents of which are incorporated herein by reference.

BACKGROUND

1. Field

This description relates to a rechargeable battery and a pack of rechargeable batteries.

2. Description of the Related Art

Unlike a primary battery, a rechargeable battery is capable of repeated charging and discharging. A small capacity rechargeable battery may be used for a small portable electronic device such as a mobile phone, a laptop computer, or a camcorder, and a large capacity rechargeable battery may be used for a power source of a motor in a hybrid vehicle or an electric vehicle.

Typically, a rechargeable battery includes an electrode assembly for charging and discharging, a case for housing the electrode assembly, a cap plate coupled to an opening in the case, and an electrode terminal extending from the electrode assembly to outside of the cap plate.

The rechargeable battery is often assembled by connecting the electrode terminal to the electrode assembly and mounting it to the cap plate, and welding the cap plate to the case after the electrode assembly is placed in the case. In this instance, the case has an opening formed in a substantially rectangular hexahedral shape, and the electrode assembly is placed in the case through the opening in a narrow side of the case.

However, when the electrode assembly is placed in the case, the electrode assembly may be damaged by the opening in the case. In other words, placing the electrode assembly in the case without damaging the electrode assembly is difficult.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a rechargeable battery configured for easy placing of an electrode assembly in the case, preventing vent damage, and easy pack assembly.

In one embodiment, a rechargeable battery is provided which prevents damage to a vent from swelling pressure.

In one embodiment, a rechargeable battery includes an electrode assembly for charging and discharging a current, a case having an opening in a direction intersecting a plane of the electrode assembly, and a cover for tightly closing the opening in the case which houses the electrode assembly therein, wherein the case further includes a vent formed as one unit therewith on one side of an extension direction of the plane of the electrode assembly, and a vent protective portion formed around the vent in a preset range.

The case may include a bottom for supporting a flat portion of the electrode assembly on an opposite side of the opening, and a side wall having a predetermined height along a circumference of the bottom.

The side wall may include one pair of a first long side wall and a second long side wall parallel to each other, and one pair of a first short side wall and a second short side wall intersecting and connected to the first long side wall and the second long side wall parallel to each other, and the vent is formed in the first long side wall.

The vent protective portion may include the first long side wall adjacent to the vent and a first protruded portion protruded to an inner side of the case from the bottom.

The vent protective portion may further include a second protruded portion protruded to the inner side of the case from the cover adjacent to the vent.

The first long side wall may further include an electrolyte injection hole between the first protruded portion of the case and the second protruded portion of the cover adjacent to the vent.

The electrode assembly has spirally wound end portions facing the first short side wall and the second short side wall, respectively.

The case may be electrically connected to the first electrode of the electrode assembly, and the case may have a terminal hole formed therein with an electrode terminal mounted thereto in an insulated state and electrically connected to a second electrode of the electrode assembly.

The electrode assembly may have spirally wound portions facing the first long side wall and the second long side wall, respectively.

The rechargeable battery may further include an insulating plate mounted between the first long side wall and the electrode assembly, and the electrode assembly may have an uncoated portion of the first electrode connected to an inside wall of the first long side wall with a first lead tab by welding and may have an uncoated portion of the second electrode connected to the electrode terminal with a second lead tab.

In another aspect of the present invention, a rechargeable battery pack may include: unit cells each including an electrode assembly, a case for housing the electrode assembly therein having an opening formed in a direction intersecting a plane of the electrode assembly, a vent provided thereto formed as one unit therewith on one side of an extension direction of the plane of the electrode assembly, and a vent protective portion provided around the vent; and a cover for tightly closing the opening, and bus bars for electrically connecting the unit cells.

The vent protective portion may form a first protruded portion protruded to an inner side of the case from a side wall and a bottom of the case adjacent to the vent to form a first buffering recess between adjacent unit cells. The vent protective portion may form a second protruded portion protruded to an inner side of the case from the cover adjacent to the vent to form a second buffering recess between adjacent unit cells.

Since the rechargeable battery of the present invention has a wide opening in the case which intersects a plane of the electrode assembly to place the electrode assembly through the wide opening to house the electrode assembly in the case, the assembling of placing the electrode assembly in the case is easy.

Further, since the rechargeable battery of the present invention has the vent in the side wall of the case and the vent protective portion around the vent, vent damage caused by swelling pressure may be prevented or minimized.

DETAILED DESCRIPTION

The present invention will be described more fully hereinafter with reference to the accompanying drawings, such that persons in this field of art can easily carry out the present invention. However, the present invention may be embodied in different modes, and is not limited to the description of embodiments made herein. Parts not relevant to the present invention will be omitted for clarity in describing the present invention, and throughout the specification, identical or similar parts will be given the same reference numbers.

Figure 1:
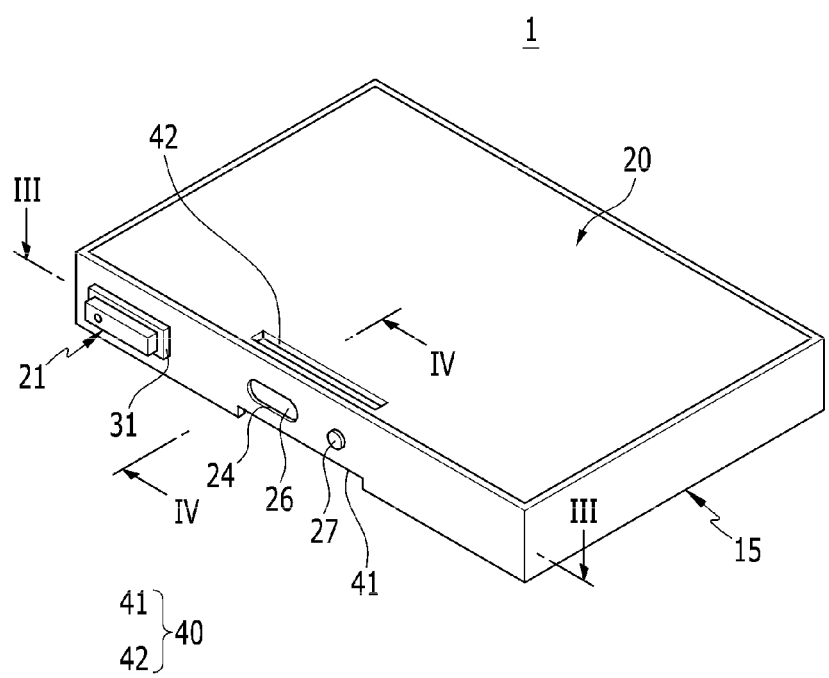
FIG. 1 illustrates a perspective view of a rechargeable battery in accordance with a first embodiment of the present invention.
Figure 2:
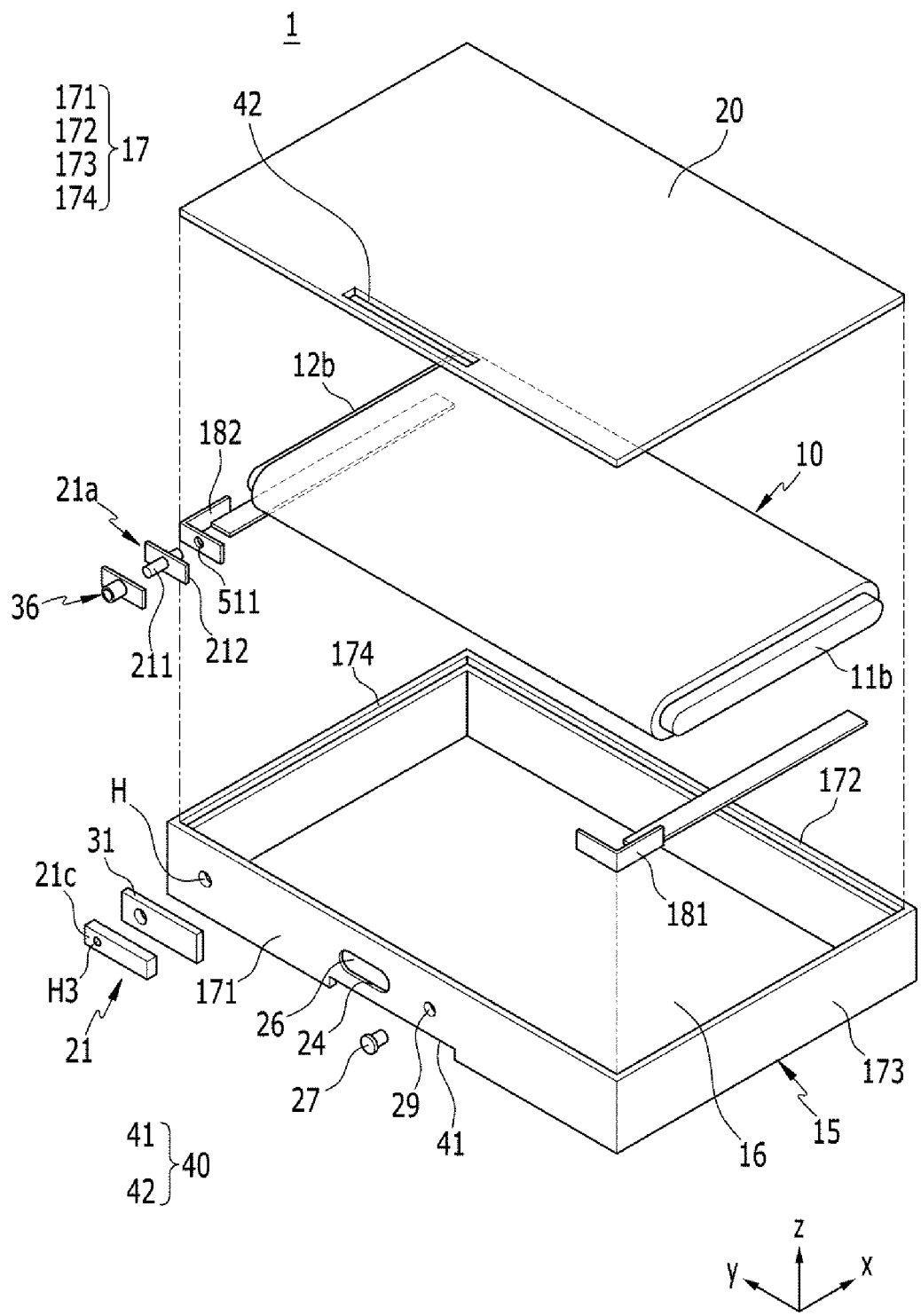
FIG. 2 illustrates an exploded perspective view of the rechargeable battery in FIG. 1.

FIG. 1 illustrates a perspective view of a rechargeable battery in accordance with a first embodiment of the present invention, and FIG. 2 illustrates an exploded perspective view of the rechargeable battery in FIG. 1. Referring to FIGS. 1 and 2, the rechargeable battery 1 includes an electrode assembly 10 for charging and discharging a current, a case 15 for housing the electrode assembly 10 therein, and an electrode terminal 21 mounted in a terminal hole H in the case 15 and electrically connected to the electrode assembly 10.

Figure 3:
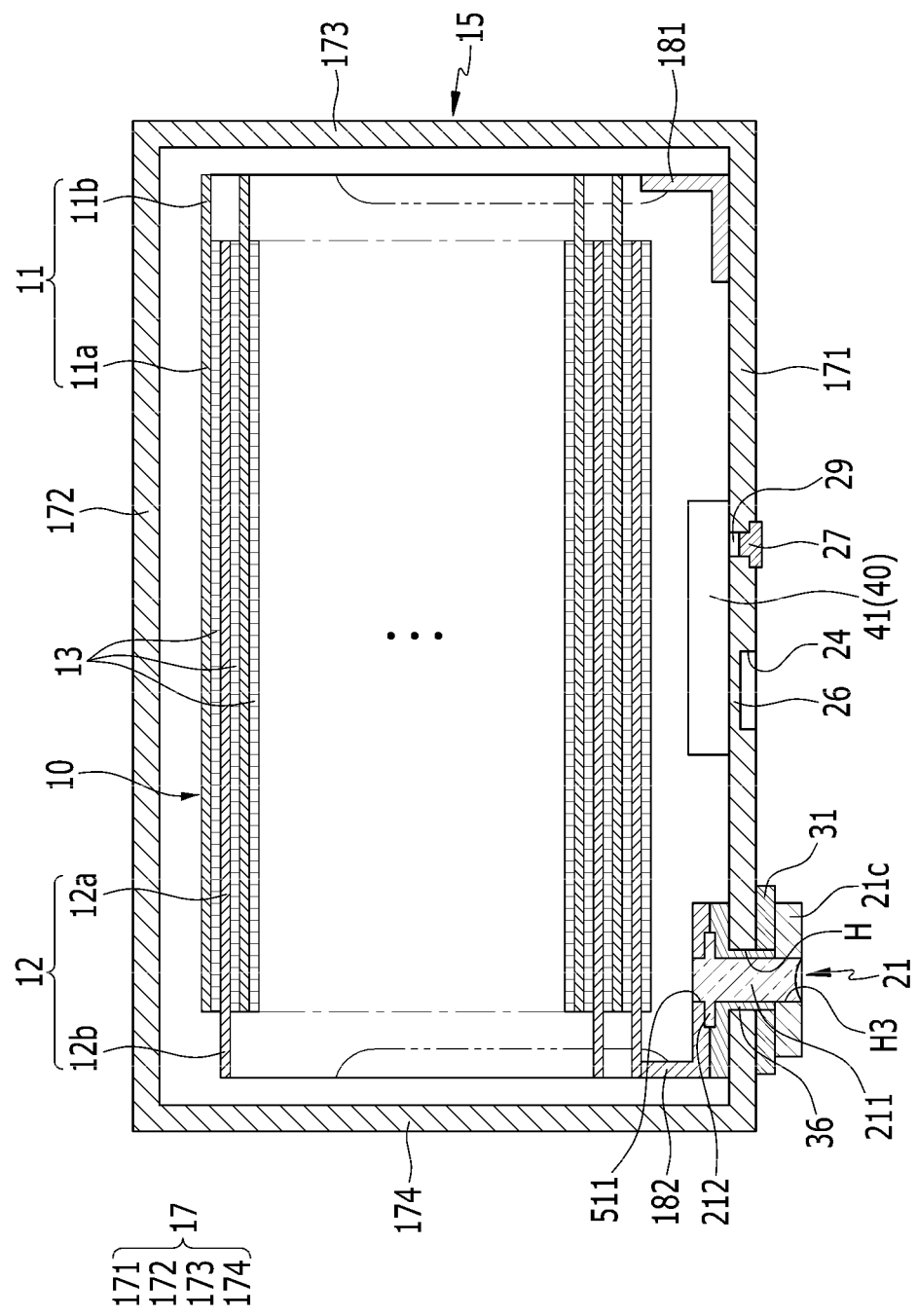
FIG. 3 illustrates a cross-sectional view across a line III-III in FIG. 1.

FIG. 3 illustrates a cross-sectional view across a line III-Ill in FIG. 1. Referring to FIGS. 2 and 3, the electrode assembly 10 has a tabular shape to be housed in the case 15, in which a first electrode 11 (also called a "positive electrode") and a second electrode 12 (also called a "negative electrode") arranged at respective sides of a separator 13 which is an insulator are spirally wound in a jelly-roll shape.

The positive and negative electrodes 11 and 12 respectively include a coated portion 11a and 12a having an active material coated on a current collector made of a metal foil (for example, an Al or Cu foil), and an uncoated portion 11b or 12b of the current collector having no active material coated thereon to expose the current collector.

The uncoated portion 11b of the positive electrode 11 is formed on one end portion of the positive electrode 11 which is spirally wound. The uncoated portion 12b of the negative electrode 12 is formed on one end portion of the negative electrode 12 which is spirally wound. Further, the uncoated portions 11b and 12b are arranged on opposite sides of the electrode assembly 10.

The case 15 may have a substantially rectangular hexahedral shape having one opened side to form a space for housing the electrode assembly 10. The opening in the case 15 is formed in a direction (an x-axis direction) which intersects a plane (xy-plane) of the electrode assembly 10. In other words, the opening is formed on a wide side of the case 15.

Therefore, the electrode assembly 10 may be placed in the case 15 in the z-axis direction which intersects the xy-plane. In other words, since the electrode assembly 10 is placed in the wide opening of the case 15, the assembling for placing the electrode assembly 10 in the case 15 becomes easier.

In one embodiment, the case 15 has a bottom 16 for supporting a flat portion of the electrode assembly 10 on an opposite side of the rectangular opening, and a side wall 17 having a substantially constant height along an outside circumference of the bottom 16. The bottom 16 is formed in a substantially rectangular shape that is matched to the flat portion of the electrode assembly 10, and the side wall 17 is matched to the height of the electrode assembly 10 in the z-axis direction.

The side wall 17 includes one pair of a first long side wall 171 and a second long side wall 172 that are parallel to each other and one pair of a first short side wall 173 and a second short side wall 174 that are parallel to each other and intersected with and connected to the first long side wall 171 and the second long side wall 172. The first and second long side walls 171 and 172 are longer than the first and second short side walls 173 and 174. The first long side wall 171 has a terminal hole H formed for mounting the electrode terminal 21 therein.

The case 15 has a vent 26 integral with the case on one side thereof in a direction of extension from the xy-plane of the electrode assembly 10 (an x-axis direction in FIG. 2), and a vent protective portion 40 formed around the vent 16. In one embodiment, the vent 26 is formed in the first long side wall 171 to be thinner than the first long side wall 171 at the first long side wall 171 having the terminal hole H formed therein.

The case 15 is electrically connected to the positive electrode 11 and houses the electrode assembly 10. In one embodiment, the positive electrode 11 is directly electrically connected to an inside surface of the first long side wall 171. The electrode assembly 10 is housed in the case 15 such that the flat portion faces the bottom 16. Accordingly, the spirally wound end portions of the tabular electrode assembly 10 face the first and second short side walls 173 and 174, respectively.

The first long side wall 171 of the case 15 has an electrolyte injection hole 29 adjacent to the vent 26. The electrolyte injection hole 29 enables injection of the electrolyte into the case 15 after coupling and welding the cover 50 to the case 15. After injecting the electrolyte, the electrolyte injection hole 29 is closed with a sealing plug 27.

Since the vent 26 is formed by compressing the first long side wall 171, a recessed vent hole 24 is formed therein. If the inside pressure of the rechargeable battery 1 reaches a preset pressure due to the charging and discharging of the electrode assembly, the vent 26 is opened at the vent hole 24 for discharging the gas, and consequently, the inside pressure is reduced. In one embodiment, the vent 26 may have a notch for inducing the cut open.

The cover 20 is mounted to the opening of the case 15 to seal the case 15. In one embodiment, the case 15 and the cover 20 of aluminum may be welded together at the opening.

The positive electrode 11 of the electrode assembly 10 may be electrically connected to the first long side wall 171 of the case 15 through a first lead tab 181 (hereinafter, "positive electrode lead tab"). In one embodiment, the positive electrode lead tab 181 may be directly connected to the inside surface of the first long side wall 171 by welding. Accordingly, the case 15 and the cover 20 in the rechargeable battery 1 are charged as the positive electrode and the case 15 functions as a positive electrode terminal.

The negative electrode 12 of the electrode assembly 10 is electrically connected to the electrode terminal 21 mounted in the terminal hole H in the first long side wall 171 through a second lead tab 182 (hereinafter, "negative electrode lead tab"). The electrode terminal 21 functions as a negative electrode terminal.

In one embodiment, the electrode terminal 21 includes a plate terminal 21c arranged on an outside of the first long side wall 171 matched to the terminal hole H, and a rivet terminal 21a mounted to the first long side wall 171 and passed through the terminal hole H to be electrically connected to the electrode assembly 10 and fastened to the plate terminal 21c.

The plate terminal 21c has a pass through hole H3, and the rivet terminal 21a passes through the terminal hole H with an upper side thereof and is placed in the pass through hole H3. The rivet terminal 21a includes a column portion 211 placed in the terminal hole H in the first long side wall 171, and a flange portion 212 formed on one end of the column portion 211. The flange portion 212 has a larger area than a cross-section of the column portion 211 arranged inside of the first long side wall 171.

Gaskets 36 are respectively mounted between the column portion 211 of the rivet terminal 21a and an inside surface of the terminal hole H in the first long side wall 171 for sealing, and electrically insulating, between the column portion 211 of the rivet terminal 21a and the terminal hole H in the first long side wall 171.

The gasket 36 has an extension between the flange portion 212 and the inside surface of the first long side wall 171, for further sealing and electrically insulating between the flange portion 212 and the first long side wall 171. In other words, at the time the electrode terminal 21 is mounted to the first long side wall 171, the gasket 36 prevents the electrolyte from leaking through the terminal hole H.

The positive and negative electrode lead tabs 181 and 182 electrically connect the first long side wall 171 and the electrode terminal 21 to the positive and negative electrodes 11 and 12 of the electrode assembly 10, respectively. In other words, the positive and negative electrode lead tabs 181 and 182 are connected to the first long side wall 171 and the rivet terminal 21a on one side, and are connected to the uncoated portions 11b and 12b of the electrode assembly 10 by welding on the other side.

As the column portion 211 of the rivet terminal 21a is placed in a coupling hole 511 in the negative electrode lead tab 182, and the flange portion 212 supports surroundings of the coupling hole 511, the rivet terminal 21a is electrically connected to the negative electrode lead tab 182. A periphery of the column portion 211 and the coupling hole 511 may be subjected to caulking or welding.

An insulating member 31 is placed between the plate terminal 21c on a side of the electrode terminal 21 and the first long side wall 171 for electrically insulating the plate terminal 21c from the first long side wall 171. In other words, the first long side wall 171 and the case 15 maintain an insulated state from the electrode terminal 21.

By coupling the insulating member 31 and the plate terminal 21c to a top side of the rivet terminal 21a and riveting or welding the top side, the insulating member 31 and the plate terminal 21c are fastened to the top side of the rivet terminal 21a. The plate terminal 21c is mounted to an outside of the first long side wall 171 and the insulating member 31 is interposed therebetween.

Figure 4:
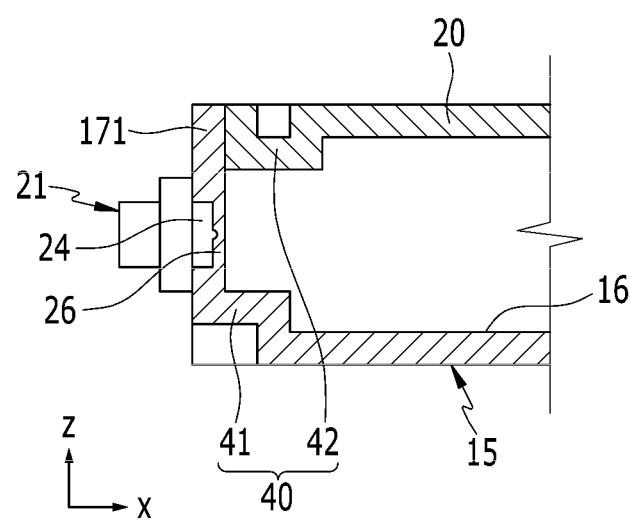
FIG. 4 illustrates a cross-sectional view across a line IV-IV in FIG. 1.

FIG. 4 illustrates a cross-sectional view across a line IV-IV in FIG. 1. Referring to FIG. 4, the vent protective portion 40 is constructed of the first long side wall 171 adjacent to the vent 26 and the vent hole 24, and a first protruded portion 41 protruded from the bottom 16 toward an inner side of the case 15.

By cutting off a path of a swelling pressure which may influence the vent 26 once as the swelling pressure is transmitted in a direction of the xy-plane of the case 15, the first protruded portion 41 provides strong resistance against the swelling pressure acting in the z-axis direction of the rechargeable battery 1. In other words, the first protruded portion 41 increases strength of the first long side wall 171 around the vent 26 against the swelling pressure in the case 15.

Therefore, when swelling pressure acts on the rechargeable battery 1, the first protruded portion 41 and the first long side wall 171 around the first protruded portion 41 may maintain shapes thereof, even if the case 15 and the cover 20 are deformed. In other words, at the time of swelling, the deformation of the vent 26 may be prevented or minimized. Accordingly, even if the swelling occurs at the rechargeable battery 1, the vent 26 may open securely under a preset internal pressure.

Further, the vent protective portion 40 may further include a second protruded portion 42 protruded to an inner side of the case 15 from the cover 20 adjacent to the vent 26. By cutting off the path of the swelling pressure which may influence the vent 26 once as the swelling pressure is transmitted in the xy-plane direction of the case 20, the second protruded portion 42 provides strong resistance against the swelling pressure acting in the z-axis direction of the rechargeable battery 1. In other words, the second protruded portion 42 increases strength of the first long side wall 171 around the vent 26 against the swelling pressure in the cover 20.

Therefore, when the swelling pressure acts on the rechargeable battery 1, the second protruded portion 42 and the first long side wall 171 around the second protruded portion 42 may maintain shapes thereof even if the case 15 and the cover 20 are deformed. In other words, at the time of swelling, deformation of the vent 26 may be prevented. Therefore, even if the swelling occurs at the rechargeable battery 1, the vent 26 may open securely at the preset internal pressure.

The electrolyte injection hole 29 is provided in the first long side wall 171 on one side of the first protruded portion 41 or between the first protruded portion 41 and the second protruded portion 42. Therefore, the first protruded portion 41 or the first and second protruded portions 41 and 42 may also reinforce strength of the first long side wall 171 which may be weakened by the electrolyte injection hole 29.

Hereafter, the rechargeable battery in accordance with a second embodiment of the present invention will be described. Configurations that are identical or substantially similar to those of the first preferred embodiment of the present invention will be omitted, and different configurations will be described.

Figure 5:
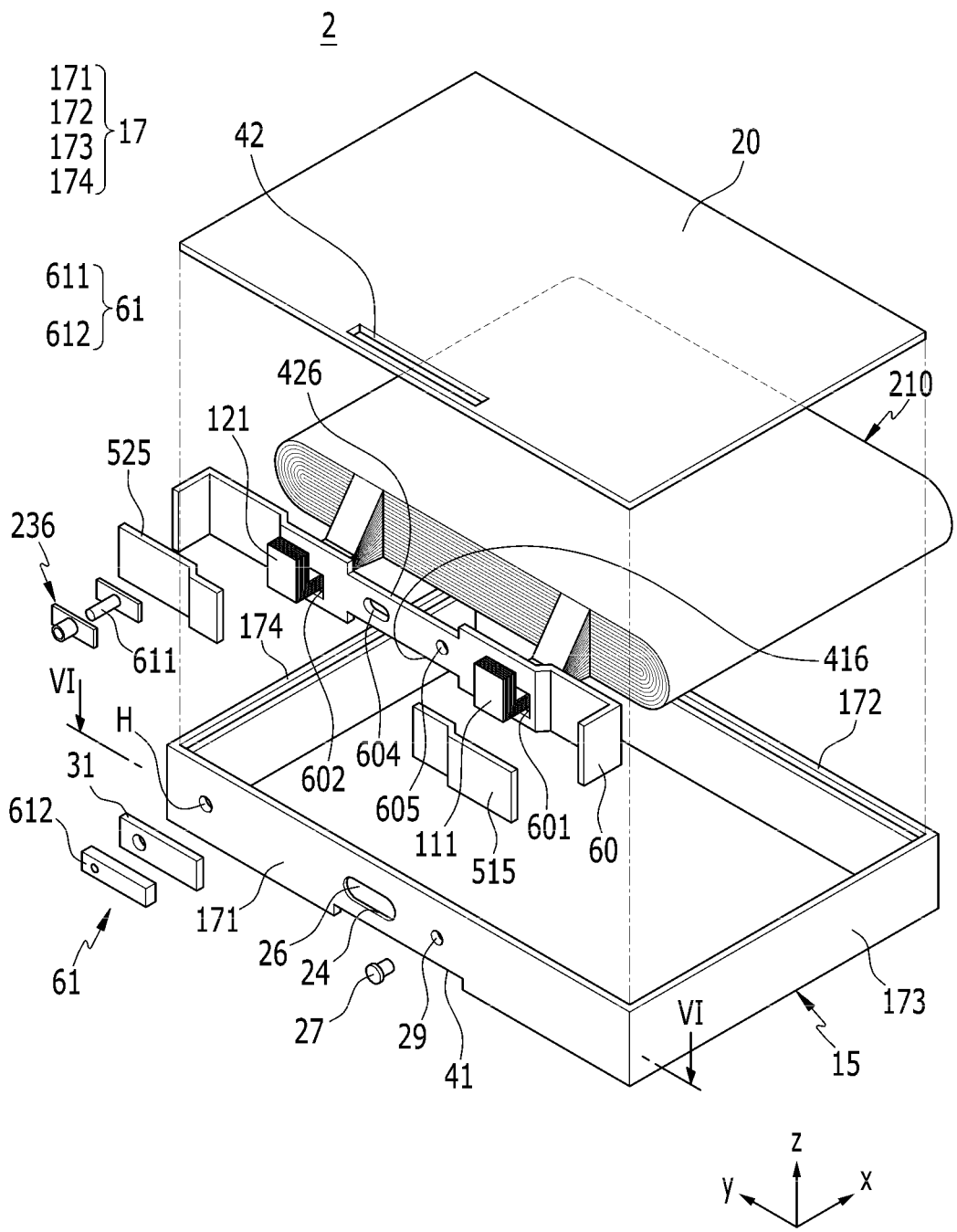
FIG. 5 illustrates an exploded perspective view of a rechargeable battery in accordance with a second embodiment of the present invention.
Figure 6:
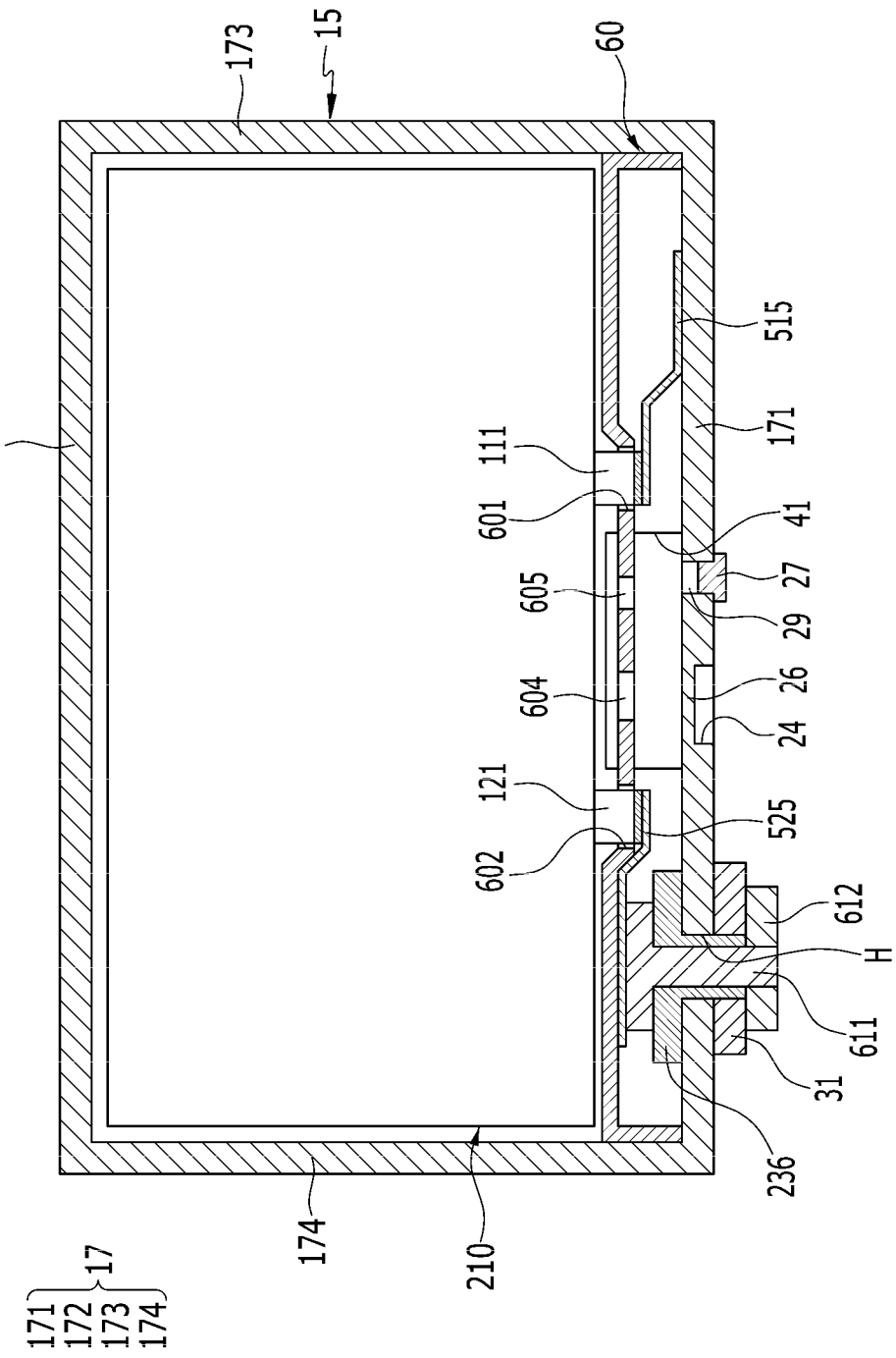
FIG. 6 illustrates a cross-sectional view across a line VI-VI in FIG. 5.

FIG. 5 illustrates an exploded perspective view of a rechargeable battery in accordance with a second preferred embodiment of the present invention, and FIG. 6 illustrates a cross-sectional view across a line VI-VI in FIG. 5. Referring to FIGS. 5 and 6, in the second embodiment of the present invention, the rechargeable battery 2 has the spirally wound end portions of an electrode assembly 210 facing the first long side wall 171 and the second long side wall 172, respectively.

Even if the spirally wound end portions of the electrode assembly 210 face the first and second long side walls 171 and 172 respectively, since the xy-plane of the electrode assembly 210 is placed in the z-axis direction which intersects the wide opening of the case 15, assembling in which the electrode assembly 210 is placed in the case 15 becomes easier.

The rechargeable battery 2 in accordance with the second embodiment of the present invention further includes an insulating plate 60 mounted between the first long side wall 171 and the electrode assembly 210. The insulating plate 60 is arranged to an inside surface of the first long side wall 171 for insulating the first long side wall 171 from the electrode assembly 210.

The insulating plate 60 has an inside vent hole 604 matched to the vent hole 24. Since the inside vent hole 604 is formed matched to the vent hole 24 in the first long side wall 171, the inside vent hole 604 may transmit the inside pressure raised by the gas generated in the electrode assembly 210 to the vent hole 24 and discharge it therefrom.

Further, the insulating plate 60 has an inside electrolyte injection hole 605 provided matched to the electrolyte injection hole 29. Since the inside electrolyte injection hole 605 is formed matched to the electrolyte injection hole 29 provided to the first long side wall 171, the electrolyte injected through the electrolyte injection hole 29 may be injected into the insulating plate 60.

The insulating plate 60 has a first recess portion 416 matched to the first protruded portion 41 and a second recess portion 426 matched to the second protruded portion 42. The first recess portion 416 receives and supports a side of the first protruded portion 41 of the case 15 for preventing interference between the first recess portion 416 and the first protruded portion 41, and the second recess portion 426 receives and supports a side of the second protruded portion 42 of the cover 20 for preventing interference between the second recess portion 426 and the second protruded portion 42.

In one embodiment, uncoated portions 111 and 121 of the electrode assembly 210 housed in the case 15 are electrically connected to the first long side wall 171 and an electrode terminal 61 via pass through holes 601 and 602 in the insulating plate 60, respectively.

The uncoated portion 111 of the positive electrode is connected to an inside surface of the first long side wall 171 with a positive electrode lead tab 515 provided between the insulating plate 60 and the first long side wall 171 by welding. Therefore, in the rechargeable battery 2, the case 15 and the cover 20 are charged as positive electrodes and the case 15 functions as a positive terminal.

The uncoated portion 121 of the negative electrode 12 is connected to the electrode terminal 61 with a negative electrode lead tab 525 provided between the insulating plate 60 and the first long side wall 171. Therefore, the electrode terminal 61 functions as a negative terminal.

The negative electrode lead tab 525 is welded to a rivet terminal 611 of the electrode terminal 61 between the insulating plate 60 and the first long side wall 171, and the rivet terminal 611 is connected to a plate terminal 612 passed through the terminal hole H. In one embodiment, the insulating member 31 is located between the plate terminal 612 and the first long side wall 171, and a gasket 236 is located between the rivet terminal 611 and the terminal hole H.

The rechargeable battery 2 illustrates protection of the vent 26 from the swelling pressure by respectively providing the first and second protruded portions 41 and 42 to the case 15 and the cover 20, even if the spirally wound end portions of the electrode assembly 210 face the first long side wall 171 and the second long side wall 172, respectively.

Hereinafter, a rechargeable battery pack having the rechargeable battery in accordance with an embodiment of the present invention applied thereto will be described. Configurations that are identical or substantially similar to configurations of the rechargeable battery will be omitted, while configurations that are different from the configurations of the rechargeable battery will be described.

Figure 7:
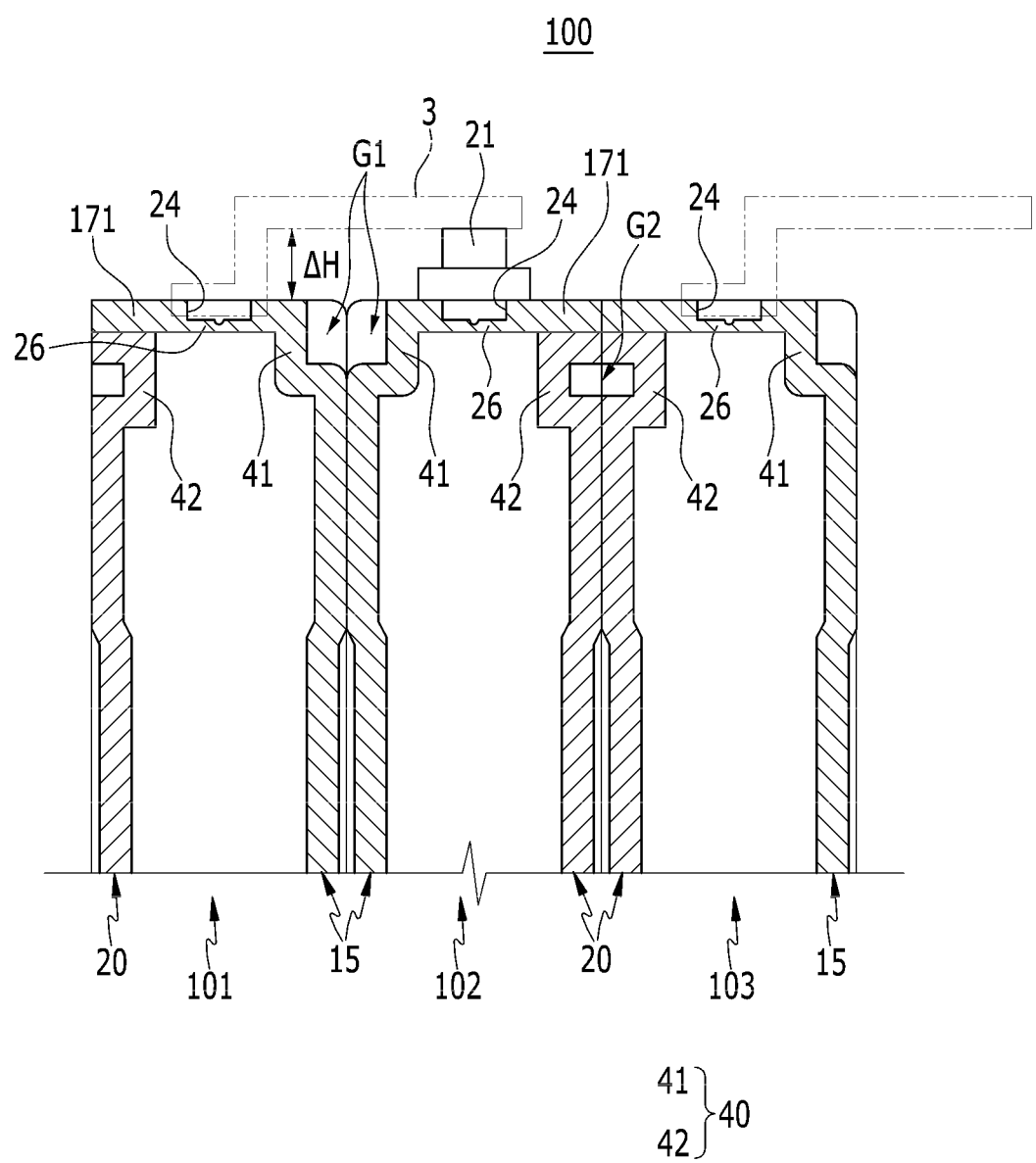
FIG. 7 illustrates a perspective view of a rechargeable battery pack in accordance with an embodiment of the present invention.

FIG. 7 illustrates a perspective view of a rechargeable battery pack in accordance with a preferred embodiment of the present invention. Referring to FIG. 7, the rechargeable battery pack 100 in accordance with a first preferred embodiment of the present invention includes a plurality of unit cells (i.e., a first unit cell 101, a second unit cell 102, and a third unit cell 103), and bus bars 3 electrically connecting the first, second, and third unit cells 101, 102, and 103 together.

The rechargeable battery pack 100 will be described taking the rechargeable battery 1 in accordance with the first embodiment of the present invention as an example. The electrode terminal 21 of the first unit cell 101 and the case 15 of the second unit cell 102 have a height difference ΔH therebetween. Accordingly, the bus bar 3 connects the electrode terminal 21 of the first unit cell 101 to the case 15 of the second unit cell 102 with the height difference ΔH.

As an example, the bus bar 3 is connected to the first long side wall 171 of the case 15 while being bent to have the height difference ΔH. In this instance, the bus bar 3 is connected to the first long side wall 171 of the case 15 of the second unit cell 102.

In other words, by connecting the bus bars 3 having the height difference ΔH to the electrode terminals 21 and the cases 15 of the first and second unit cells 101 and 102 that are adjacent to one another, no alignment of the bus bars 3 is required, so pack assembling may become easier.

In the first and second unit cells 101 and 102 of the rechargeable battery pack 100 that are adjacent to each other, the vent protective portions 40, i.e., one pair of first protruded portions 41, are protruded to inner sides of the cases 15 from the side walls 17 and the bottoms 16 of the cases 15, respectively.

Accordingly, the one pair of the first protruded portions 41 form a first buffering recess G1 between the first and second unit cells 101 and 102 which are adjacent to each other. The first buffering recess G1 may buffer the swelling pressure acting from the first or second unit cell 101 or 102 to an opposite unit cell.

Further, one pair of the second protruded portions 42 are protruded to inner sides of the cases 15 from the covers 20 adjacent to the vents 26, respectively. According to this, the one pair of the second protruded portions 42 form a second buffering recess G2 between the second and third unit cells 102 and 103 which are adjacent to each other. The second buffering recess G2 may buffer the swelling pressure acting from the second or third unit cell 102 or 103 to an opposite unit cell.

In other words, in the rechargeable battery pack 100, the first and second buffer recesses G1 and G3 prevent the vents 26 of the other adjacent unit cells from being damaged by swelling of the first, second, or third unit cell 101, 102, or 103.

Although the rechargeable battery and the rechargeable battery pack in accordance with embodiments of the present invention have been described, the present invention is not limited to this, and variations and modifications are possible within the scope of the claims, detailed description of the present invention, and accompanying drawings, which belong to the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
| --- | --- |
| 1, 2: rechargeable battery | 3: bus bar |
| 10, 210: electrode assembly | |
| 11: first electrode (positive electrode) | |
| 11 a, 12a: coated portion | |
| 11 b, 12b, 111, 121: uncoated portion | |
| 12: second electrode (negative electrode) | 13: separator |
| 15: case | 16: bottom |
| 17: side wall | 20: cover |
| 21, 61: electrode terminal | 21a, 611: rivet terminal |
| 21c, 612: plate terminal | 24: vent hole |
| 26: vent | 27: seal plug |
| 29: electrolyte injection hole | 31: insulating member |
| 36: gasket | 40: vent protective portion |
| 41, 42: first, second protruded portion | 60: insulating plate |
| 100: rechargeable battery pack | |
| 101, 102, 103: first, second, third unit cells | |
| 171, 172: first, second long side walls | |
| 173, 174: first, second short side walls | |
| 181, 515: first lead tab (positive electrode lead tab) | |
| 182, 525: second lead tab (negative electrode lead tab) | |
| 211: column portion | 212: flange portion |
| 416, 426: first, second recess portions | 511: coupling hole |
| 604: inside vent hole | 605: inside electrolyte injection hole |
| 601, 602: pass through opening | |
| G1, G2: first, second buffering recesses | |
| H: terminal hole | Δ H: height difference |

What is claimed is:

1. A rechargeable battery comprising:
an electrode assembly;
a case accommodating the electrode assembly, the case having a plurality of side walls; and
a cover sealing the case,
wherein the case further includes a vent integral with the case and configured to discharge gas, and
a vent protective portion adjacent to the vent, the vent protective portion including a first step protruding inwardly from one of the side walls towards the electrode assembly on one side of the vent and a second step protruding from the cover inwardly towards the electrode assembly on another side of the vent.

2. The rechargeable battery of claim 1, wherein the case further comprises:
a bottom for supporting the electrode assembly; and
wherein the side walls extend along a circumference of the bottom.

3. The rechargeable battery of claim 2, wherein the side walls include:
a first long side wall and a second long side wall being parallel to each other; and
a first short side wall and a second short side wall intersecting and connected to the first long side wall and the second long side wall and being parallel to each other, and
wherein the vent is in the first long side wall.

4. The rechargeable battery of claim 3, wherein the first step protrudes to an inner side of the case from the bottom.

5. The rechargeable battery of claim 3, wherein the second step protrudes to the inner side of the case from the cover adjacent to the vent.

6. The rechargeable battery of claim 3, wherein the first long side wall further includes an electrolyte injection hole between the first step of the case and the second step of the cover adjacent to the vent.

7. The rechargeable battery of claim 3, wherein the electrode assembly has spirally wound end portions facing the first short side wall and the second short side wall, respectively.

8. The rechargeable battery of claim 1, wherein the case is electrically connected to a first electrode of the electrode assembly, and wherein the case has a terminal hole with an electrode terminal mounted thereto in an insulated state and being electrically connected to a second electrode of the electrode assembly.

9. The rechargeable battery of claim 3, wherein the electrode assembly has spirally wound portions facing the first long side wall and the second long side wall, respectively.

10. The rechargeable battery of claim 9, further comprising an insulating plate mounted between the first long side wall and the electrode assembly,
wherein the electrode assembly has an uncoated portion of the first electrode connected to an inside wall of the first long side wall with a first lead tab by welding, and
wherein the electrode assembly has an uncoated portion of the second electrode connected to the electrode terminal with a second lead tab.

11. A rechargeable battery pack comprising:
unit cells each comprising an electrode assembly, a case accommodating the electrode assembly, the case having a plurality of side walls, a vent integral with the case and configured to discharge gas, and a vent protective portion provided adjacent to the vent, and a cover for sealing the case, the vent protective portion including a first step protruding inwardly from one of the side walls towards the electrode assembly on one side of the vent and a second step protruding from the cover inwardly towards the electrode assembly on another side of the vent; and
bus bars for electrically connecting adjacent unit cells.

12. The rechargeable battery pack of claim 11, wherein the vent protective portion forms a first buffering recess between adjacent unit cells.

13. The rechargeable battery pack of claim 12, wherein the vent protective portion forms a second buffering recess between adjacent unit cells.

* * * * *